(No Model.)

P. FOLEY.
BASIN CLAMP.

No. 269,274. Patented Dec. 19, 1882.

Witnesses
J. Staib
Chas H Smith

Inventor
Patrick Foley
per Lemuel W. Serrell
atty

UNITED STATES PATENT OFFICE.

PATRICK FOLEY, OF BROOKLYN, NEW YORK.

BASIN-CLAMP.

SPECIFICATION forming part of Letters Patent No. 269,274, dated December 19, 1882.

Application filed August 31, 1882. (No model.)

*To all whom it may concern:*

Be it known that I, PATRICK FOLEY, of Brooklyn, in the county of Kings and State of New York, have invented an Improvement in Basin-Clamps, of which the following is a specification.

Stationary wash-basins are usually provided with projecting rims or flanges around their upper edges, and these flanges are clamped to the under surfaces of marble or stone slabs. The basin-flanges vary considerably in thickness, and difficulty is experienced in applying the clamp so as to take an even and firm bearing upon the basin-flange, and with the clamps heretofore used the bolt is liable to be unduly strained and loosened by turning the nut, because the clamping-bar is often at an inclination, and the nut does not take a proper bearing upon such bar.

My invention relates to the combination of devices hereinafter set forth, whereby the basin-clamp can be adapted to any desired thickness of flange, and the clamp is strong and can be placed on or taken off a basin-flange with facility.

Figure 1:
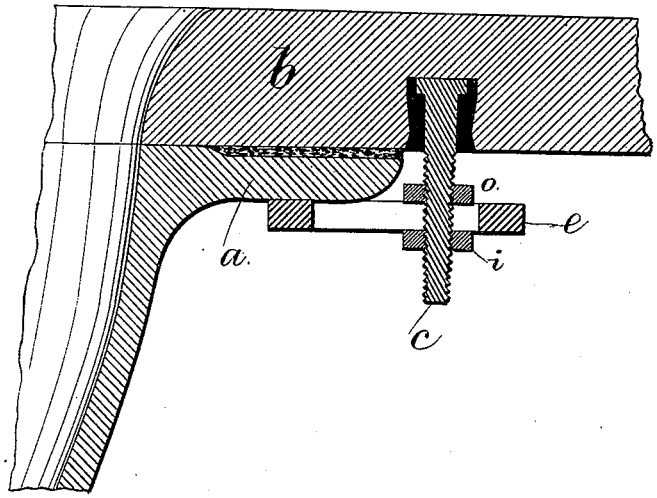
Figure 2:
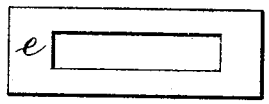

In the drawings, Figure 1 is a section representing the edge of the basin and the slab, and Fig. 2 is a plan view of the slotted clamping-bar.

The basin-flange $a$ and the slab $b$ are of ordinary character.

$c$ is a screw-bolt, with a head that is inserted into a cavity or hole made in the under surface of the slab adjacent to the edge of the basin-flange. Such hole, however, does not extend entirely through the slab, and the bolt-head is firmly leaded into said hole.

The clamping-bar $e$ is slotted, so as to pass freely over the bolt $c$, and there is a set-nut, $i$, on the outside and a nut, $o$, on the inside of the clamping-bar. The slot in the clamping-bar allows the same to be moved endwise until it properly laps upon the under surface of the basin-flange, and the nut $o$ is adjusted until its surface is slightly nearer the slab than the surface of the basin-flange. Hence, when the nut $i$ is screwed firmly against the clamping-bar, the basin-flange is subjected to a firm pressure, because the two nuts hold the clamping-bar firmly between themselves, while such bar extends out over the basin-flange. By this construction the clamp can be adjusted to suit any thickness of basin-flange, and there is no risk of bending or injuring the parts of the clamp, because the bolts are always sufficiently strong, and the nuts clamping the two surfaces of the clamping-bar produce a device similar to a rigid clamp leaded into the under surface of the slab.

I claim as my invention—

The combination, with the screw-bolt, the slotted clamp-bar $e$, and nut $i$, of the nut $o$ upon the screw-bolt between the clamp-bar $e$ and the slab, for the purposes and as set forth.

Signed by me this 28th day of August, 1882.

PATRICK FOLEY.

Witnesses:
 GEO. T. PINCKNEY,
 HAROLD SERRELL.